(12) United States Patent
Stevens

(10) Patent No.: US 6,835,883 B2
(45) Date of Patent: Dec. 28, 2004

(54) READILY TRANSPORTABLE MUSICAL INSTRUMENT STAND

(75) Inventor: Robert Stevens, Laurel, MD (US)

(73) Assignee: Old Dog LLC, Laurel, MD (US)

( * ) Notice: Subject to any disclaimer, the term of this patent is extended or adjusted under 35 U.S.C. 154(b) by 0 days.

(21) Appl. No.: 10/754,576

(22) Filed: Jan. 12, 2004

(65) Prior Publication Data

US 2004/0139838 A1 Jul. 22, 2004

Related U.S. Application Data

(63) Continuation-in-part of application No. 10/161,340, filed on Jun. 3, 2002, now abandoned.

(51) Int. Cl.⁷ .................................................. G01G 7/02
(52) U.S. Cl. ............................. 84/453; 84/327; 84/329
(58) Field of Search ........................... 84/453, 327, 329, 84/421

(56) References Cited

U.S. PATENT DOCUMENTS

| | | |
|---|---|---|
| 3,282,437 A | 11/1966 | Hansen |
| 3,593,955 A | 7/1971 | Hind |
| 3,737,137 A | 6/1973 | Shehan |
| D353,729 S | 12/1994 | MacOwan |
| 5,744,735 A | 4/1998 | Liao |
| 6,015,121 A | 1/2000 | Reid |
| 6,150,595 A | 11/2000 | Vaglica |
| 6,316,706 B1 | 11/2001 | Sammons |
| 6,323,405 B1 | 11/2001 | Yu |
| 6,323,406 B1 | 11/2001 | Park |
| 6,559,365 B2 * | 5/2003 | Wilfer .......................... 84/327 |
| 6,563,035 B2 * | 5/2003 | Hsieh .......................... 84/327 |

OTHER PUBLICATIONS

BG Soprano Sax/Trumpet Stand, admitted prior art; advertisement and color photograph of stand in assembled and disassembled configurations.

* cited by examiner

Primary Examiner—Kimberly Lockett
(74) Attorney, Agent, or Firm—Nixon & Vanderhye P.C.

(57) ABSTRACT

A stand for a musical instrument is sturdy, durable, virtually unbreakable, lightweight, simple and inexpensive to construct, and supports an instrument (e.g. a string instrument) in an upright readily accessible manner; yet the stand is simple easy to disassemble for ready transport in a low volume configuration. The stand includes two substantially planar (e.g. molded of polycarbonate) support pieces, with a slide connection between them. An abutment piece preferably fits between the support pieces for ease of transport, and when the stand is assembled fits atop the support pieces. The neck of a guitar, violin, banjo, or like instrument, fits in a recess in the abutment piece, while the body of the instrument is supported by leg portions of the support pieces. A locking member, such as an elastic strap, can extend over the recess to prevent the instrument from detaching from the stand. The stand can be constructed to support multiple instruments.

21 Claims, 9 Drawing Sheets

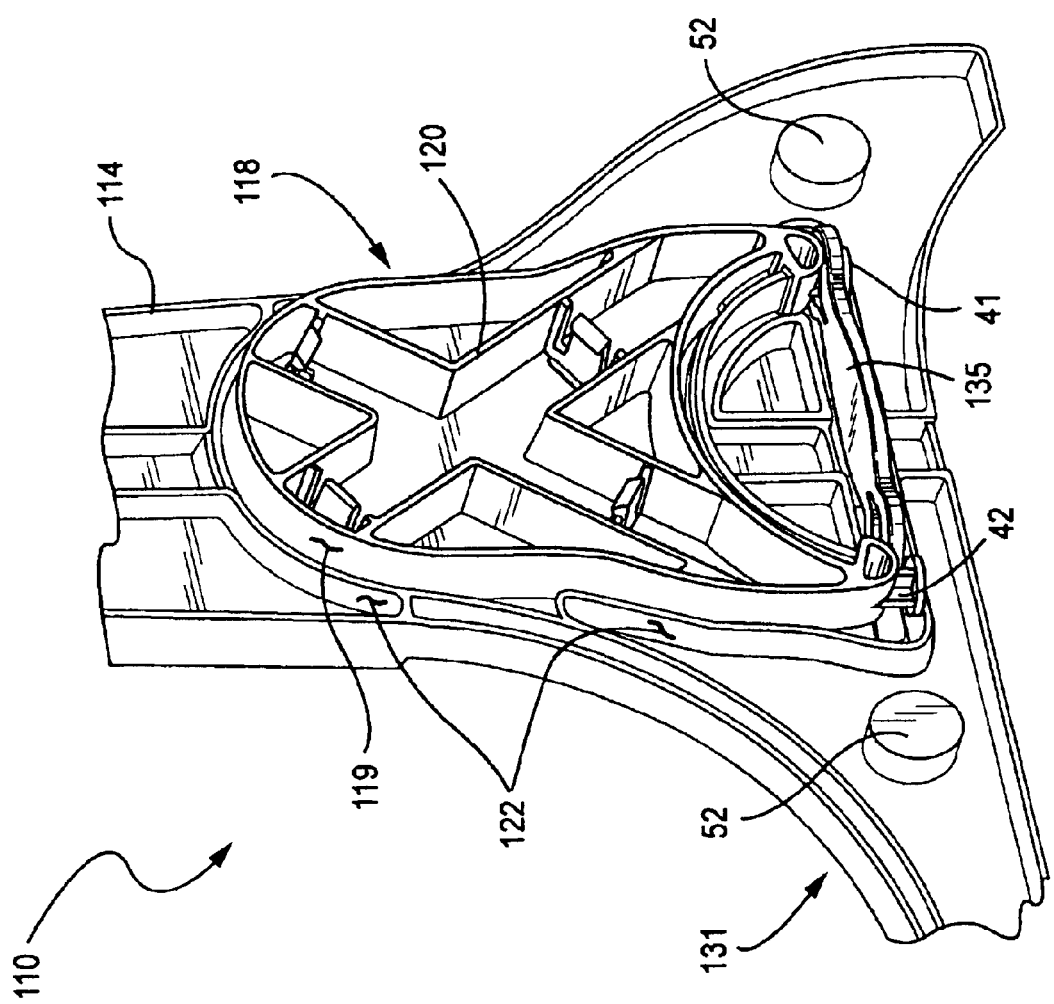

READILY TRANSPORTABLE MUSICAL INSTRUMENT STAND

CROSS-REFERENCE TO RELATED APPLICATION

This application is a continuation-in-part of U.S. application Ser. No. 10/161,340 filed Jun. 3, 2002, abandoned, published Dec. 4, 2003 as #20030221538.

BACKGROUND AND SUMMARY OF THE INVENTION

The invention relates to a readily transportable stand. Most desirably, the stand is for securely supporting a musical instrument, particularly a string instrument such as a guitar, violin, viola, or bass. There are many times during practice or a performance when musicians are not playing a particular musical instrument, but want to have the instrument nearby and ready to be quickly accessed (e.g. when the musician switches between acoustic and electric guitars). However, it is also important that the instrument be securely supported when not being used so that it will stay in tune and not be damaged or excessively worm. These functions are typically achieved by using a stand for the instrument which mounts the instrument in a generally upright and readily accessible manner, such as shown in U.S. Pat. Nos. 3,737,137, 5,744,735, 6,316,706, 6,323,405 and 6,323,406, and Design Pat. 353,729. However such conventional stands often do not have a high degree of portability, either being difficult or impossible to move from a supporting position to a lower volume transporting position, and/or being heavy and cumbersome, and conventional stands are also often prone to break. Since musicians travel extensively from one job to another, it is highly desirable to have a virtually unbreakable, relatively lightweight, low volume (during transport) stand that still securely supports a device, preferably a musical instrument, particularly a string instrument, in an upright, readily accessible manner.

According to the invention, a stand in general is provided that allows the user to securely support an accessory structure when assembled, but when disassembled is easy to transport, being both relatively light and taking up a low volume. The invention is particularly well suited for use with string musical instruments, having a neck connecting a head and a body with strings extending across the neck from the head to the body. A non-limiting list of such instruments is guitars (both acoustic and electric), violins, banjos, ukeleles, violas, and basses. The invention can be readily constructed of a strong, virtually unbreakable, lightweight, aesthetic material, preferably a plastic such as polycarbonate (e.g. LEXAN® from General Electric), may be easily assembled and disassembled, and can securely support both the neck and body of the instrument. The stand of the invention also preferably has a minimum number of pieces and no "moving parts". This not only means it can be low cost, but also there will be fewer pieces to keep track of, and be lost.

According to one aspect of the present invention, there is provided a stand, comprising: First and second support pieces, each having a leg portion and an upright portion. First and second readily attachable and detachable connection portions formed in the first and second upright portions, respectively, the connection portions providing ready attachment and detachment of the support pieces, so as to allow the first and second support pieces to be moved from a supporting stand configuration to a low volume easily transportable configuration. An abutment piece having a peripheral portion and an engagement portion, with the upright portions dimensioned and configured to engage the engagement portion of the abutment piece when the connection portions are attached. And cooperating first and second surface portions formed in the first and second support pieces, respectively, dimensioned and configured to engage the peripheral portion of the abutment piece when the support piece connection portions are detached. In a preferred embodiment, the abutment piece peripheral portion comprises first and second legs with a substantially U-shaped recess between them.

Preferably the first and second surface portions have a friction fit with the abutment piece peripheral portion so that the abutment piece and support pieces are held together when the connection portions are detached and the abutment piece peripheral portion engages both the first and second surface portions. This allows the components to be transported together without any accessory mechanism, such as a bag or wrap [elastic or otherwise], to hold them together (although it is within the broadest aspect of the invention to use such a bag, wrap, or other accessory mechanism). The stand may have only these three pieces, that is consist essentially of the first and second support pieces and the abutment piece.

Alternatively, the stand may further comprise a latching element cooperable with the abutment piece to define a substantially horizontally closed vertically extending passage [that is, one through which the neck of a string instrument may pass, and be held securely in position]. In this latter case, the stand may have only these four components, that is consist essentially of the first and second support pieces, the abutment piece, and the latching element. While the latch may comprise a strap (and associated hook and loop fastener attachments), hook, or other conventional mechanism, in a preferred embodiment the latching element comprises an elastic element which has surface manifestations cooperable with the first and second legs of the abutment piece peripheral portion, to releasably close off the substantially U-shaped recess.

The support pieces and/or the abutment piece are preferably substantially planar for ease of construction and use, and are preferably made of molded polycarbonate, such as LEXAN®, or a like material having the high strength, light weight, durability, aesthetic, and versatility of LEXAN®. The connection desirably is a conventional slide connection (such as shown in U.S. Pat. No. 3,593,955 or the commercially available BG soprano sax/trumpet stand), especially when the support pieces are substantially planar. "Substantially planar" means that the pieces do not have a significant thickness dimension compared to the "height" and "width" dimensions, and can readily assume a low volume configuration when disassembled.

The upright portions may define a substantially X-shaped male portion when attached together by the connection portions, and the abutment piece engagement portion may comprise a substantially X-shaped female portion which cooperates with the substantially X-shaped male portion so that the abutment portion is securely supported on top of the upright portions. Desirably, the X is not completely symmetrical, so as to provide a keying function.

The stand is particularly desirable in combination with at least one string musical instrument having a neck and body with strings extending between the neck and body, the neck supported by the abutment piece, and the body supported by the leg portions, when the connection portions are attached to each other. When the latching element is engaged, it substantially precludes the neck from separating from the abutment piece, and thereby prevents the instrument from falling even if jostled when on the stand. The stand may further comprise cushioning material (such as elastomeric material, cloth, felt, rubber, leather, or the like) on parts of the leg portions which support the instrument body, to minimize marring or damage to the instrument body. Similarly, the abutment portion may have cushioning material for a similar purpose.

The stand may be constructed to support multiple devices (preferably string instruments). The first and second support piece leg portions may each comprise two curved upper surfaces dimensioned and configured to support two devices at the same time, and the abutment piece peripheral portion may define two recesses, each dimensioned and configured to support a device.

According to another aspect of the invention, there is provided a stand, comprising: Substantially planar first and second support pieces, each having a leg portion and an upright portion. First and second readily attachable and detachable connection portions formed in the first and second upright portions, respectively, the connection portions providing ready attachment and detachment of the support pieces. An abutment piece having a peripheral portion and an engagement portion. At least one (preferably both) of the upright portions are dimensioned and configured to engage the engagement portion of the abutment piece when the connection portions are attached. And a latching element cooperable with the abutment piece to define a substantially horizontally closed vertically extending passage (e.g. one suitable for containing the neck of a string musical instrument, such as a guitar).

The stand may consist essentially of the first and second support pieces, the abutment piece, and the latching element. The abutment piece peripheral portion may comprise first and second legs with a substantially U-shaped recess between them; and the latching element may comprise an elastic element which has surface manifestations cooperable with the first and second legs. The stand is most desirable in combination with at least one string musical instrument having a neck and body with strings extending between the neck and body, the neck supported by the abutment piece peripheral portion substantially U-shaped recess while the elastic element precludes detachment from the recess, and the body supported by the leg portions, when the connection portions are attached to each other.

According to another aspect of the invention, a stand is provided comprising: First and second (preferably substantially planar) support pieces of molded polycarbonate (such as LEXAN®). A slide connection between the first and second support pieces which allows ready attachment and detachment between the first and second support pieces so as to allow the first and second support pieces to be moved from a supporting stand configuration to a low volume easily transportable configuration. At least three feet (preferably four) of the first and second support pieces which engage a support surface when the first and second support pieces are attached together by the slide connection. An abutment piece comprising first and second legs with a substantially U-shaped recess between them. And cooperating manifestations on the abutment piece and at least one of the support pieces for mounting the abutment piece above the feet when the support pieces are attached together by the slide connection. The details of the stand may be as set forth above, and the stand is desirably in combination with at least one string musical instrument having a neck and body with strings extending between the neck and body, the neck supported by the abutment piece substantially U-shaped recess when the connection portions are attached to each other.

It is the primary object of the present invention to provide a sturdy, virtually unbreakable, easily transportable, easily assembled and disassembled, and aesthetic stand, most desirably for a string musical instrument so as to securely support the instrument in an upright, safe, and readily accessible manner. This and other objects of the invention will become clear from a detailed description of the invention, and from the appended claims.

BRIEF DESCRIPTION OF THE DRAWINGS

FIG. 10 is a detail perspective view of the first support piece of the stand of FIG. 7 showing the abutment piece and latching element mounted therewith;

DETAILED DESCRIPTION OF THE DRAWINGS

Figure 5:
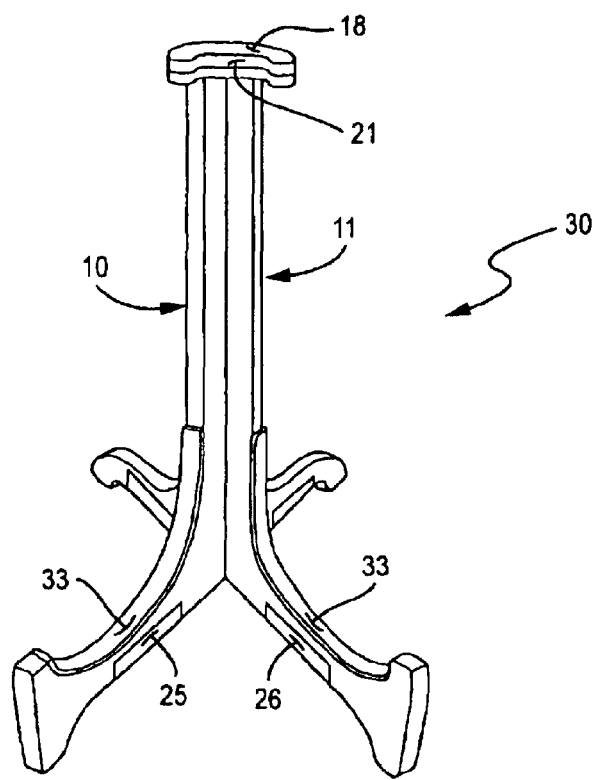
FIG. 5 is a front isometric view of the components of FIGS. 1–3 in an assembled configuration to serve as a musical instrument stand.
Figure 6:
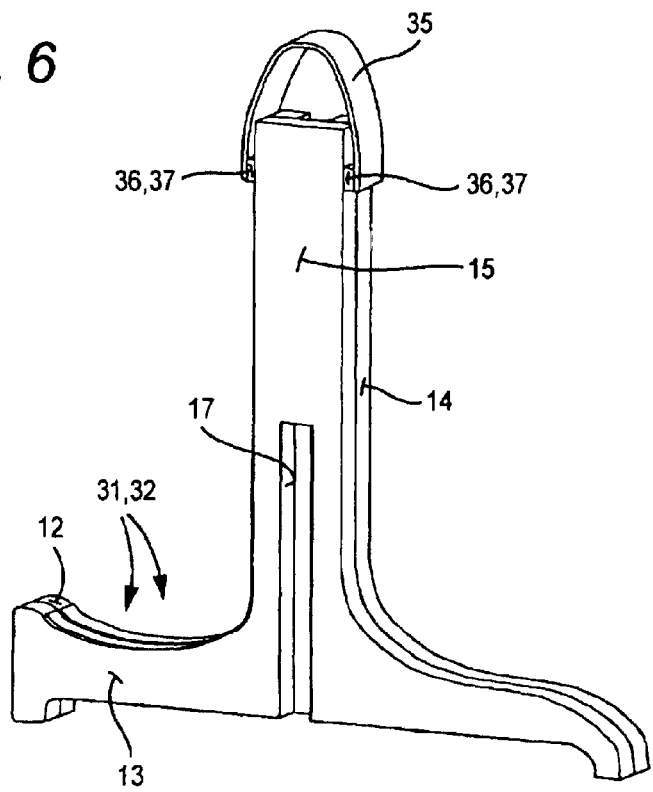
FIG. 6 is an isometric view of the components of FIGS. 1–4 is a disassembled configuration, for ready transport.

The components illustrated in FIGS. 1–4 may be assembled to form the musical instrument stand of FIG. 5 when in assembled configuration, and are readily disassembled for ease of transport to the low volume configuration of FIG. 6. The components of the embodiment illustrated in FIGS. 1–6 include first and second support pieces 10, 11, respectively, each having a leg portion 12, 13, respectively, and an upright portion 14, 15 respectively. As illustrated, the pieces 10, 11 are preferably substantially planar, and can be made of a wide variety of materials, including plastic, metal, wood, or the like. In a preferred embodiment, the pieces 10, 11 are molded of plastic, preferably polycarbonate, such as LEXAN®.

The invention also includes first and second readily attachable and detachable connection portions 16, 17, formed in the first and second upright portions, respectively, the connection portions providing ready attachment and detachment of the support pieces 10, 11. In the embodiment illustrated, the connection portions 16, 17 define a conventional slide connection, such as shown in U.S. Pat. No. 3,593,955. However, other conventional or to be developed connections that perform the same ultimate function may alternatively be provided.

The invention also comprises an abutment piece 18 (FIG. 3) having a peripheral portion 19 and an engagement portion 20. The peripheral portion 19 is constructed so as to define a recess 21 which supports the neck of a string musical instrument, such as a guitar, ukelele, banjo, viola, or the like. The exact shape of the engagement portion 20, and the dimensions of the support pieces 10, 11, and the shape and dimensions of the recess 21, may vary depending upon the size or type of the instrument desirably supported by the stand constructed therefrom.

The upright portions 14, 15 are preferably dimensioned and configured to engage the engagement portion 20 of the abutment piece 18 when the connection portions 16, 17 are attached, as in FIG. 5. In the embodiment actually illustrated the upright portions 14, 15 define a substantially X-shaped male portion when attached together by the connection portions 16, 17, and the abutment piece engagement portion 20 (as is clear from FIG. 3) comprises a substantially X-shaped female portion which cooperates with the substantially X-shaped male portion (in FIG. 5) so that the abutment piece 18 is securely supported on top of the upright portions 14, 15.

Figure 1:
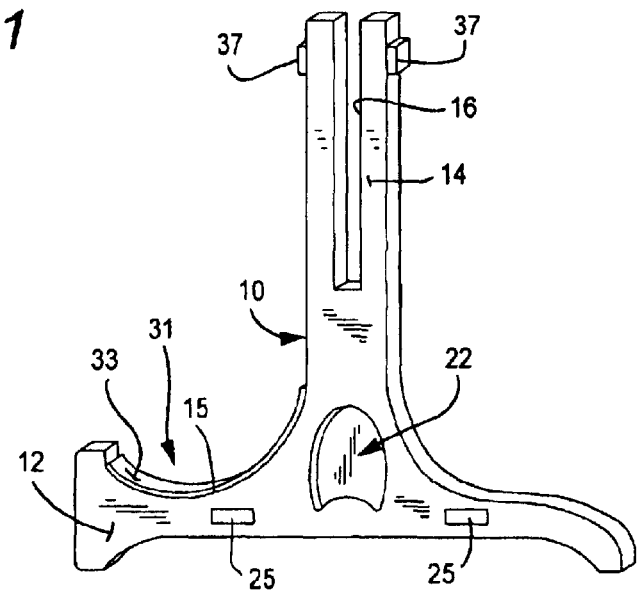
FIG. 1 is an isometric view of a first exemplary support piece according to the present invention.
Figure 2:
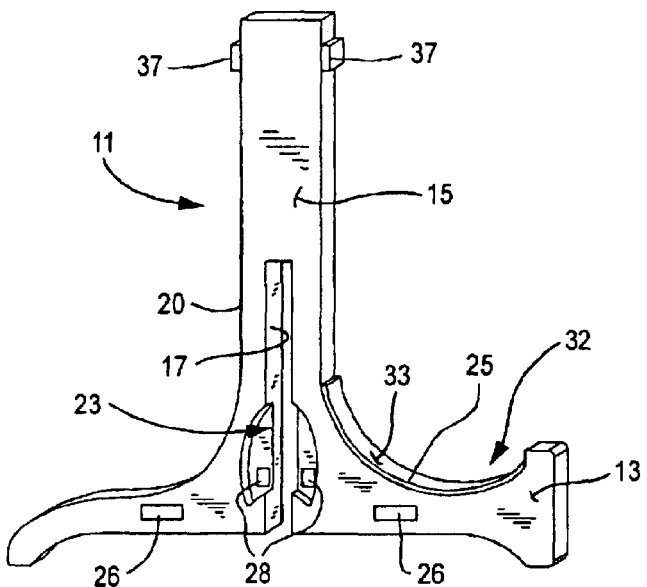
FIG. 2 is a view like that of FIG. 1 of a second exemplary support piece.
Figure 3:
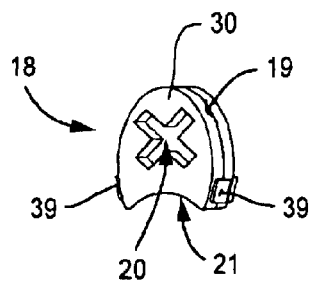
FIG. 3 is an isometric view of the bottom face of an exemplary abutment piece according to the invention.
Figure 4:
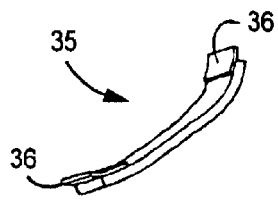
FIG. 4 is an isometric view of an optional exemplary handle/latching element according to the invention.

The invention also comprises cooperating first and second surface portions 22, 23, respectively, formed in the first and second support pieces 10, 11 (e.g. in the transition between the leg portions and the upright portions, as illustrated in FIGS. 1 & 2), respectively, dimensioned and configured to substantially engage the peripheral portion 19 of the abutment piece 18 when the support piece connection portions 16, 17 are detached, as in FIGS. 1 and 2.

Figure 8:
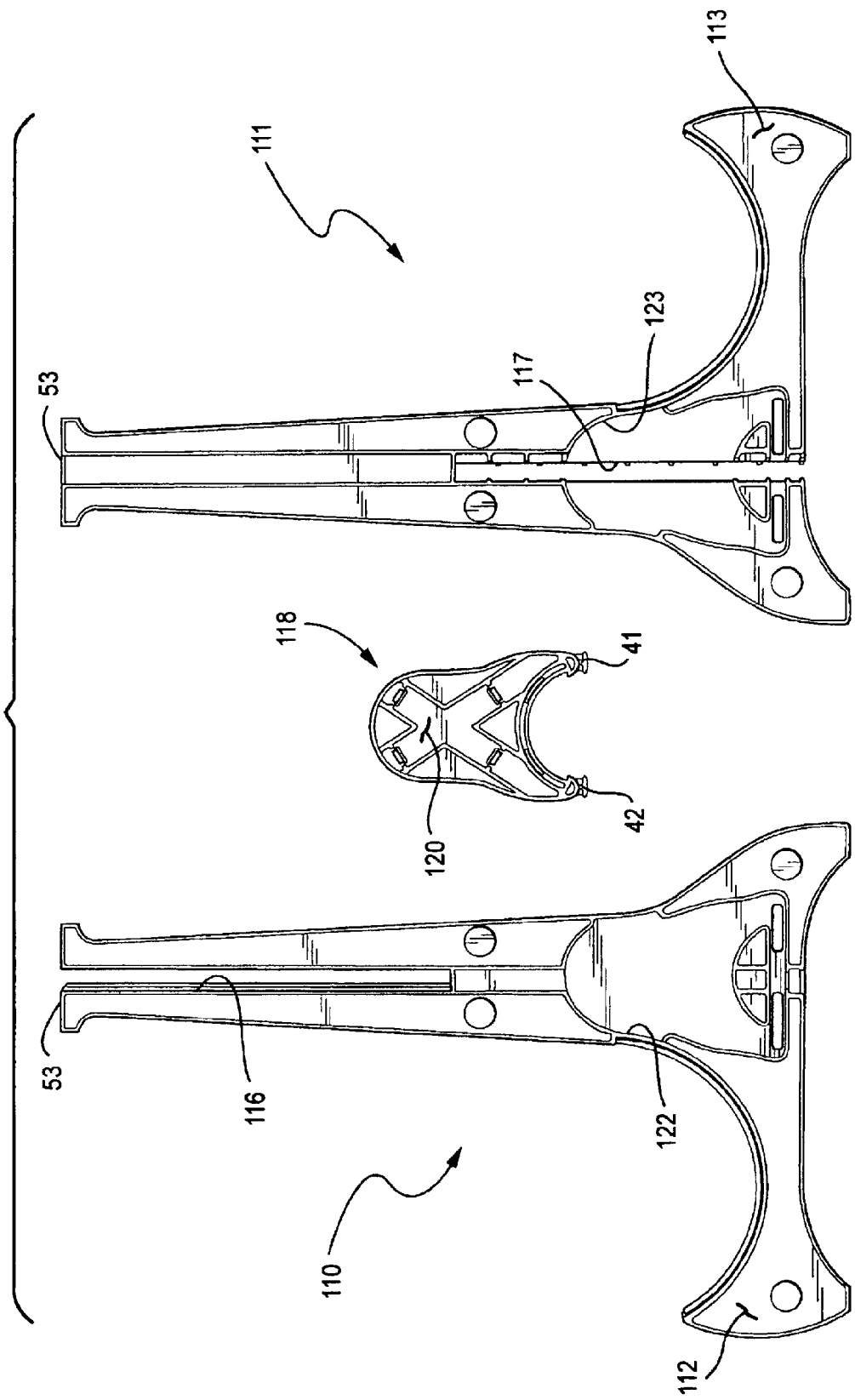
FIG. 8 is a top plan view of the support and abutment pieces of the stand of FIG. 7 in disassembled configuration.
Figure 11:
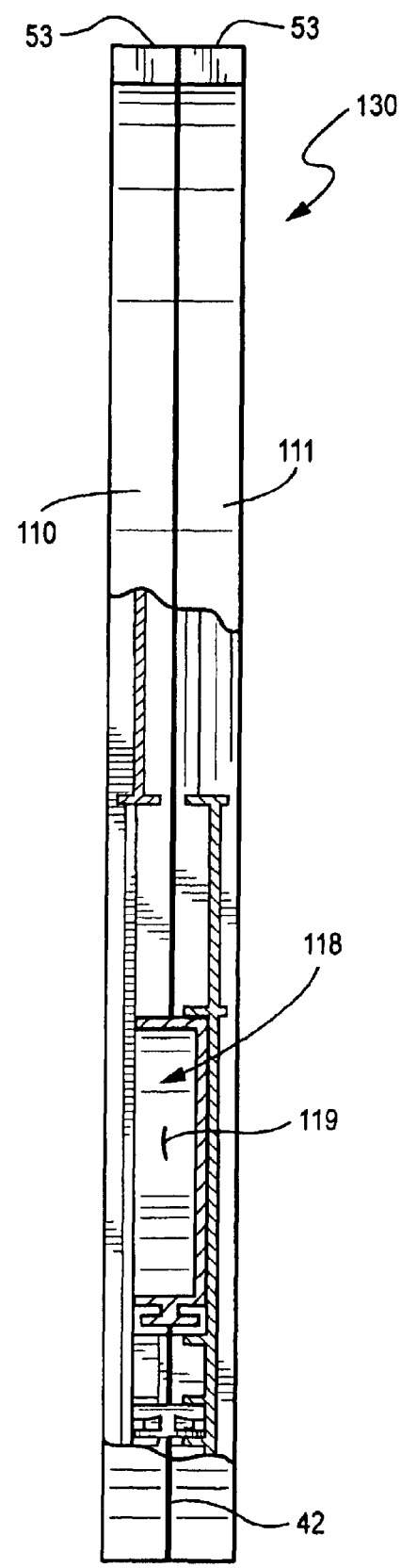
FIG. 11 is a front end view, partly in cross-section and partly in elevation, of the stand of FIG. 7 in a disassembled, low volume, configuration, for ease of transport.

In the FIGS. 1–6 embodiment, the support pieces 10, 11 may be held together in a disassembled, low volume, configuration (FIG. 6) by some accessory holding mechanism. For example, cooperating hook and loop [e.g. VELCRO®] fasteners 25, 26 may be provided on the pieces 10, 11, respectively (see FIGS. 1 & 2), or an elastic band may be wrapped around the pieces 10, 11 when in the FIG. 6 configuration, or any other conventional or to be developed mechanism for that function may be provided. Similarly, the abutment piece 18 may be held in place within a recess defined by the surface portions 22, 23 by VELCRO pads 28 (FIG. 2) cooperating with compatible pieces (not shown) on the abutment piece 18 [the abutment piece 18 is between the support pieces 10, 11 in the FIG. 6 transport configuration]. Preferably, the friction fit configuration described below with respect to FIGS. 8, 10 & 11 is used, however, either alone, or in combination with hook and loop fastener pads, to hold the pieces 10, 11 in a low volume configuration (e.g. like that of FIG. 6) for ease of transport.

When the pieces 10, 11, 18 are assembled together by moving the slide connections 16, 17 with respect to each other, the stand 30 of FIG. 5 results. In FIG. 5, the neck of the string instrument supported by the stand 30 engages the recess 21, while the body engages the top, curved, surfaces 31, 32, respectively, of the leg portions 12, 13. To minimize marring, or other harm to the instrument, cushioning material may be provided on the upper surfaces 31, 32. For example, a rubber (e.g. neoprene), felt, cloth, leather, or like cushioning material pad 33 is applied to the surfaces 31, 32 (e.g. by adhesive), and a similar pad may be provided for the recess 21 if desired. Alternatively, an over-mold of elastomeric material may be provided on the surfaces 31, 32, such as neoprene, or SANTOPRENE® engineered thermoplastic polymer.

The optional strap 35 (see FIGS. 5 & 6) may also be utilized. The strap 35 may have hook and loop fasteners 36 of one type (e.g. hooks) on the ends thereof (see FIG. 4), which cooperate with hook and loop fasteners 37 of the other type (e.g. loops) on the upright portions 14, 15 of the support pieces 10, 11 if the strap 35 is to be used as a handle, as in FIG. 6. While not illustrated in FIG. 5, the fasteners 36 may also connect to the fasteners 39 (see FIG. 3) on the abutment piece 18 to define a substantially horizontally closed vertically extending passage through which the neck of an instrument (e. g. guitar) extends when the stand 30 of FIG. 5 is in use. In that case, the strap 35 functions as a latching element, although other conventional latching components could be utilized.

FIGS. 7–11 illustrate another form of stand 130 according to the present invention. Components in the FIGS. 7–11 embodiment generally comparable to those in the FIGS. 1–6 embodiment are illustrated by the same reference numeral, only preceded by a "1". The stand 130 includes curved upper surfaces 131, 132 of the leg portions 112, 113 of the substantially planar support pieces 110, 111, respectively, that are more pronounced than in the FIGS. 1–6 embodiment, and likely to more securely hold the body of a string instrument in place. Also, the abutment piece 118 has pronounced first and second legs 41, 42, respectively, which define a substantially U-shaped recess 121 that is more pronounced than the recess 21, and which cooperates with the latching element 135 to more securely hold the neck of a string instrument in place.

Figure 7:
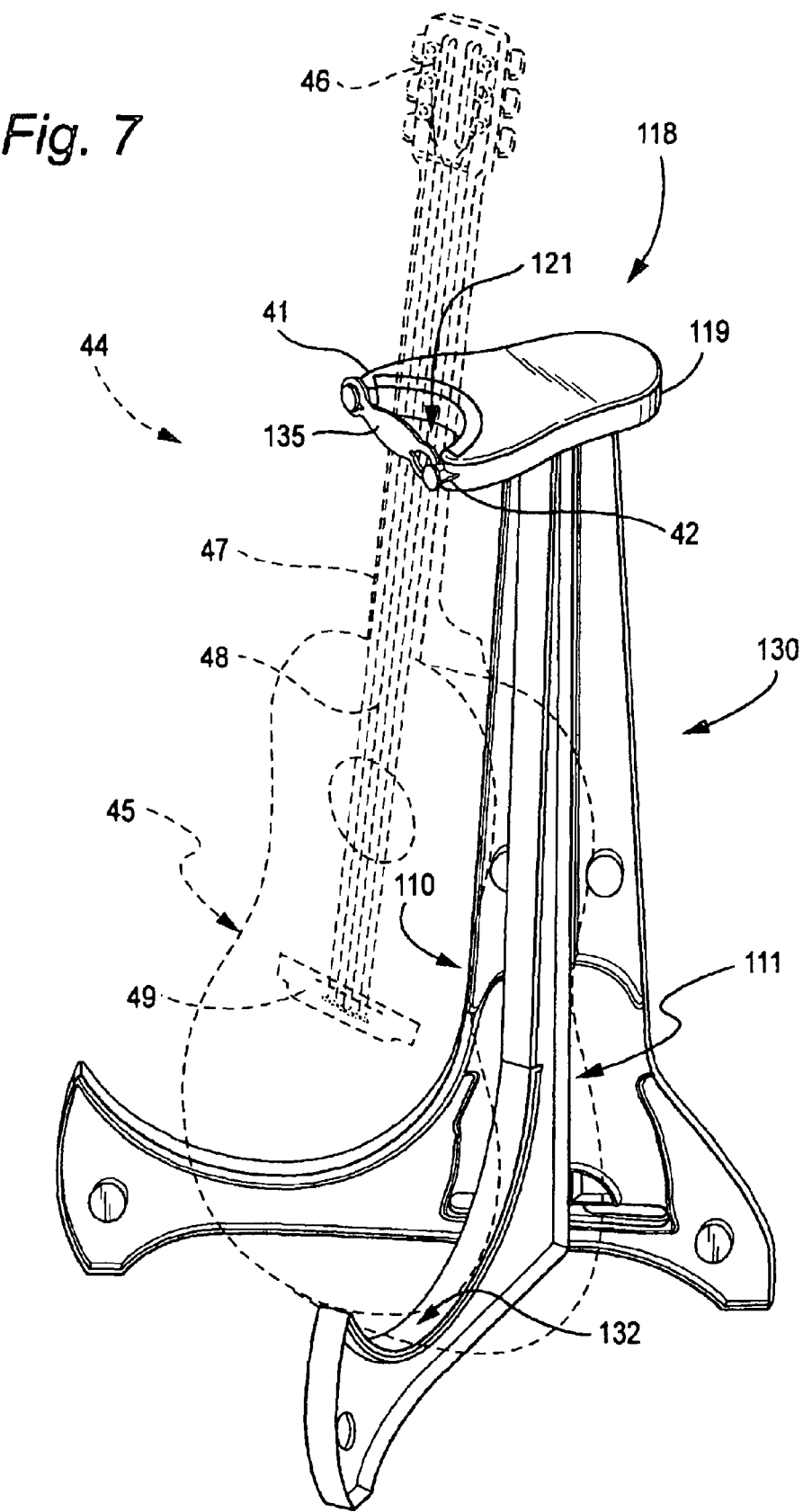
FIG. 7 is a front/side isometric view of a modified form of the stand of FIG. 5, showing a guitar supported thereby in dotted line.

FIG. 7 illustrates a conventional acoustic guitar 44 in dotted line, shown securely supported by the stand 130 in an upright, readily accessible position, although the stand 130 can equally well or even better support an electric guitar. The guitar 44, like other string instruments, has a body (which may be hollow or solid depending upon the type of instrument) 45, a head 46 with tuning pegs, and a neck 47 (typically with frets) connecting the body 45 and head 46. Strings 48 extend along the neck 47 to a bridge 49 on the body 45 from the tuning pegs on the head 46. As seen in FIG. 7, the body 45 is supported on the curved surfaces 131, 132 (or cushioning material—not shown—thereon), while the neck 47 engages the peripheral portion 119 of the abutment piece 118 at the substantially U-shaped recess 121, and is optionally further held in place in a vertical passage (see FIG. 7) defined by the recess 121 and latching element 135 by the element 135.

FIG. 8 shows the pieces 110, 111, and 118 is disassembled condition, that is where the slide connection 116, 117 is not engaged, and in which the abutment piece 118 is not mounted by the pieces 110, 111.

Figure 9:
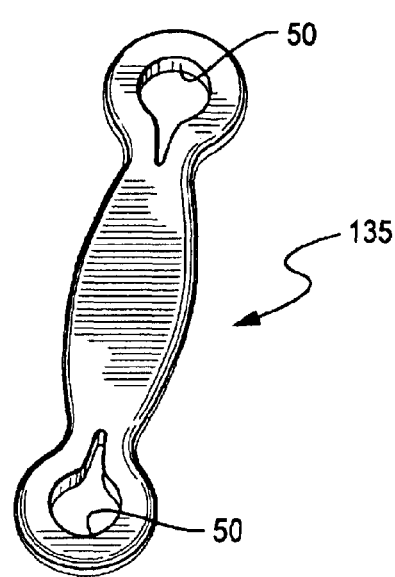
FIG. 9 is a top isometric detail view of the latching element of the FIG. 7 embodiment.

FIG. 9 shows a preferred latching element 135 in more detail. The element 135 is an elastic element (e.g. rubber strap) which has surface manifestations 50 (e.g. elongated holes) cooperable with the first and second legs 41, 42. When the holes 50 are over the legs 41, 42, the strap 135 is stretched, and simply by further stretching it to disengage one of the holes 50 from a cooperating leg 41, 42 and releasing, the latch defined by the element 135 can be disengaged.

In the FIGS. 7–11 embodiment, as seen most clearly in FIGS. 8, 10, and 11, the first and second surface portions 122, 123 of the pieces 110, 111, respectively, have a friction fit with the abutment piece 118 peripheral portion 119 so that the abutment piece 118 and support pieces 110, 111 are held together when the connection portions 116, 117 are detached and the abutment piece peripheral portion 119 engages both the first and second surface portions 122, 123. The friction fit alone may be enough to hold the pieces 110, 111 together in the low volume configuration (FIG. 11) for ease of transport. However, other components, such as circular shaped pads (like the pads 25, 26) of VELCRO glued to the raised cylindrical nubs 52 (see FIG. 10), or an elastic band, or a wrap, may be used to assist in removably holding the pieces 110, 111 together in the low volume configuration of FIG. 11.

As seen in FIG. 10 the latching element 135 may also readily be retained by the pieces 110, 111 in the low volume configuration of FIG. 11. The element 135 has at least one of the legs 41, 42 of the abutment piece 118 extending through an opening 50 therein.

FIG. 10 clearly shows the preferred friction fit between the peripheral portion 119 of the piece 118 and the surface portion 122 of the piece 110 when the stand 130 is in an disassembled configuration. Still further, the friction fit can be enhanced by providing one or more of the surfaces 122, 123 as spring-pressed into engagement with the periphery 119 of the abutment piece 118. In order to facilitate detachment of the piece 118 from the surfaces 122, 123 when assembly of the stand 130 is desired, an access opening—such as the opening 55, or a wide variety of other shape, placings, and types of openings—may be utilized. This allows the user of the stand 130 to push an implement or his/her finger through the opening 55 to release the friction fit between the surfaces 119, 122 (or 123).

FIG. 10 also clearly shows the desired substantially X-shaped female (engagement) portion 120 of the piece 118. The engagement portion 120 is configured and dimensioned to cooperate with the substantially X-shaped male portion defined by the very tops 53 of the pieces 110, 111 when assembled together (as in FIG. 7) so that the abutment piece 118 is securely supported on top of the upright portions 114, 115 of the pieces 110, 111 in the assembled condition. Also, FIG. 10 illustrates that the legs of the "X" are not exactly symmetrical, which provides a "keying" function, so that the abutment piece 118 can be assembled on the tops 53 of the support pieces 110, 111 only by facing the recess 121 toward those parts of the leg portions 112, 113 containing the curved support surfaces 131, 132. Both the pieces 18 and 118 assist in stabilizing the pieces 10, 11, 110, 111, when assembled into a stand 30, 130.

While FIG. 11 does not illustrate a handle (like the strap 35 of FIG. 6), a handle could be provided, or alternatively the stand 130 in the disassembled low volume configuration of FIG. 11 could be placed in a bag, or the like, to facilitate transport. However in the configuration of FIG. 11, the stand 130 is so easy to grasp and move it is unlikely that some accessory device is needed.

Figure 12:
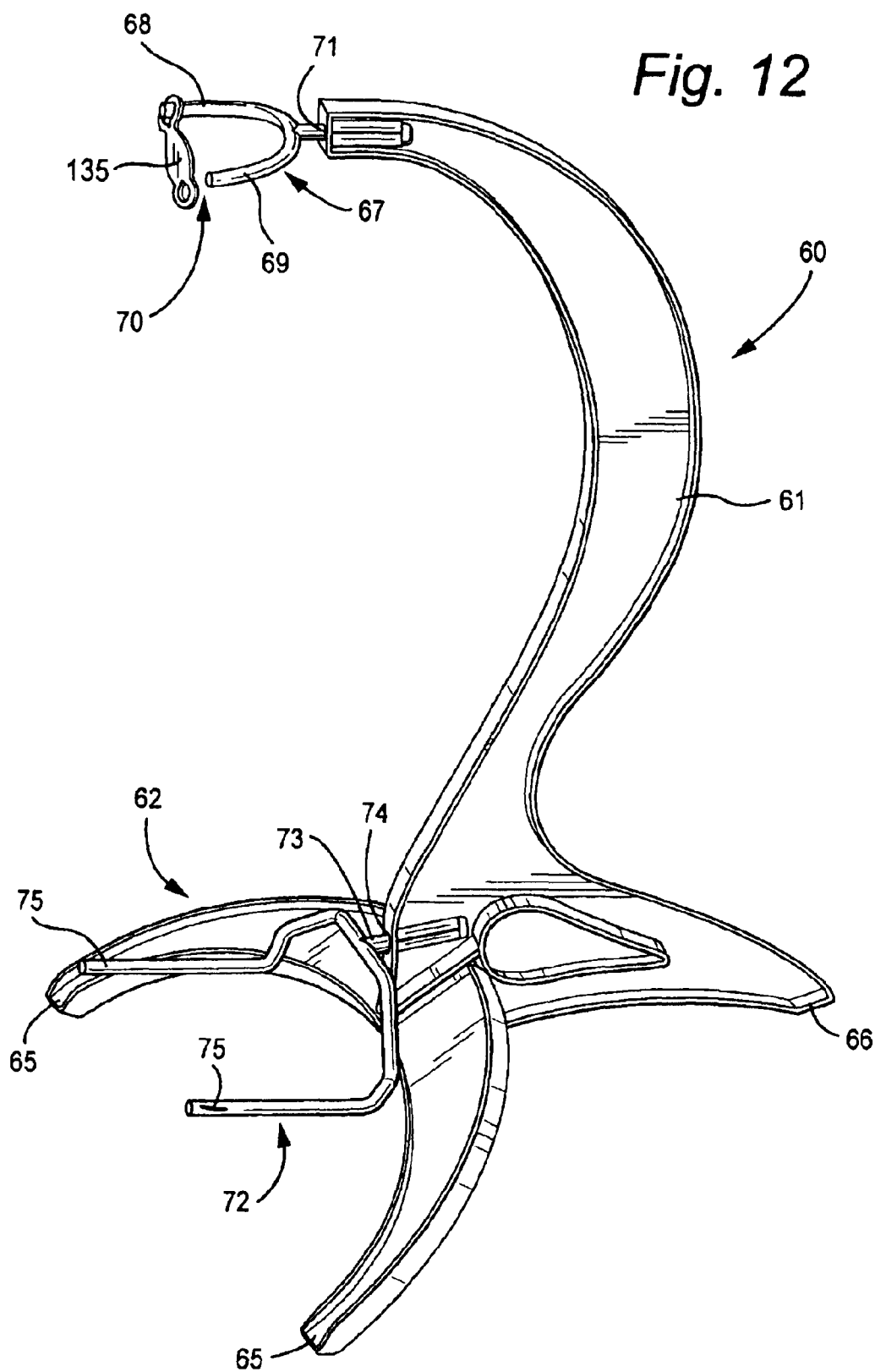
FIG. 12 is top/front isometric view of another embodiment of assembled stand according to one aspect of the present invention.
Figure 13:
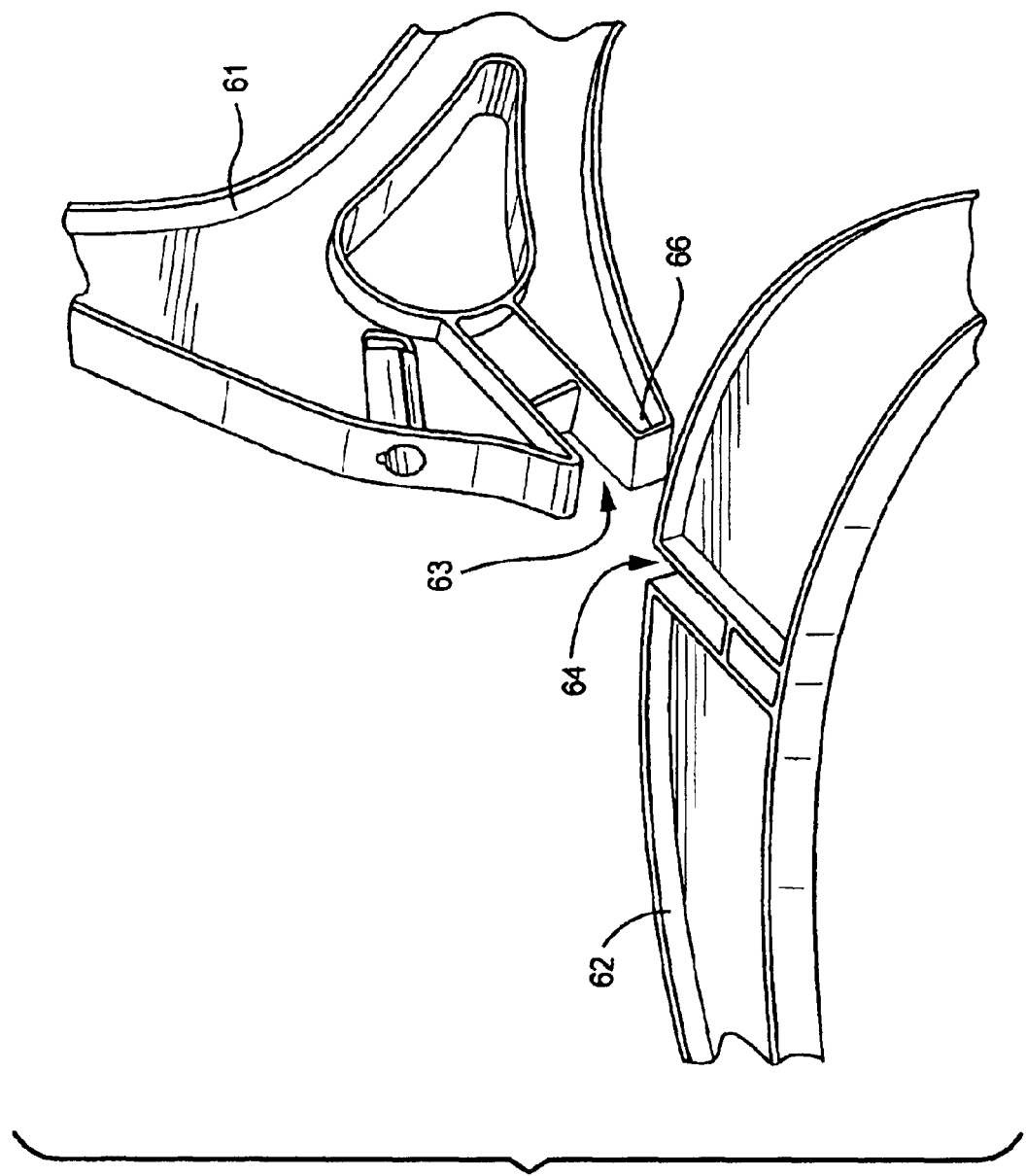
FIG. 13 is a detail isometric view of the slide connection of the stand of FIG. 12 with the component parts thereof disassembled.

FIGS. 12 and 13 show another embodiment of musical instrument supporting stand 60 that has a number of features in common with the stands 30, 130. The similarities include: The first and second pieces 61, 62 making up the stand 60 are substantially planar, and preferably molded of polycarbonate. There is a slide connection 63, 64 between the pieces 61, 62, so that they can readily be assembled and disassembled. The two feet 65 of the piece 62, and the one long or two spaced feet 66 of the piece 61 provide at least three point contact for the stand 60. There is an abutment piece 67, having first and second legs 68, 69 which define a substantially U-shaped recess 70 between them, the recess 70 dimensioned and configured to receive the neck of a string instrument. The abutment piece 67 is mounted above the feet 65, 66 of the pieces 61, 62 by surface manifestations (e.g. the hole 71 instead of the substantially X-shaped elements). A locking element 135 may extend across the recess 70 between the legs 68, 69. The stand 60 is easily assembled, sturdy when assembled, and easily disassembled and transported in a low volume configuration.

There are details of the stand 60 compared to the stands 30, 130 that are different too, however. These differences include: The abutment piece 67 fits into a generally horizontally (when the stand 60 is in use) extending hole 71 in the free end of the piece 61. The abutment piece 67 preferably is made of wire (e.g. coated with elastomeric material, such as SANTOPRENE®), rather than a molded substantially planar piece of plastic. While the piece 62 can be configured to have supports for the body of a string instrument, preferably another support piece—in the form of a wire bail 72, seen in FIG. 12—is used. The free end 73 of the bail 72 is removably received by a generally horizontally extending (during use) opening 74 in the piece 61 just above the slide connection 63, and provides arms 75 (e.g. wire coated with elastomeric material) which actually engage the body of the string instrument.

Figure 14:
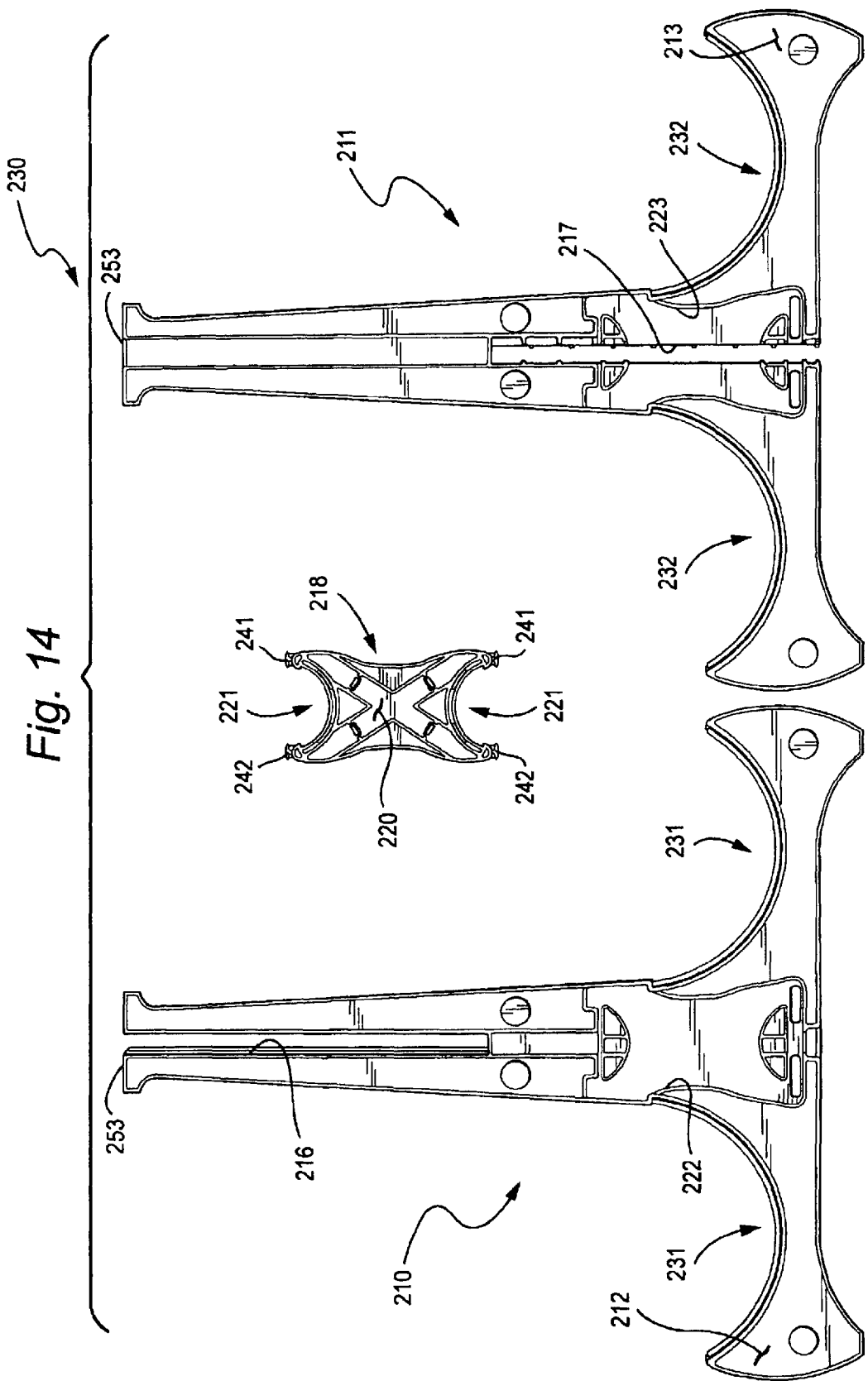
FIG. 14 is a view like that of FIG. 8 only showing a stand configured and dimensioned so as to support multiple string instruments at the same time.

Any of the stands 30, 130, 60 may be constructed so that they can support two, or even more, devices (e.g. string instruments) at the same time. FIG. 14 depicts, for example, a modification of the stand 130 for supporting two guitars, or other string instruments, at the same time. (All components in the FIG. 14 embodiment comparable to those in the FIG. 8 embodiment are shown by the same two digit reference numeral only preceded by a "2").

The stand 230 includes two substantially identical instrument-body supporting curved upper surfaces 231, 232, respectively, of each of the leg portions 212, 213 of the substantially planar support pieces 210, 211, respectively. Also, the abutment piece 218 has two sets of pronounced first and second legs 241, 242, respectively, which define two opposite substantially U-shaped recesses 221, each of which cooperates with a latching element 135 to more securely hold the neck of a string instrument in place. Thus the stand 230 can support two string instruments at the same time, one instrument engaging one set of curved upper surfaces 231, 232 and one recess 221, and the other instrument engaging the other set of curved upper surfaces 231, 232 and the other recess 221.

It will thus be seen that according to the present invention, a sturdy stand, particularly suitable for safely supporting a string instrument in an upright and readily accessible position, has been provided, which can easily be disassembled into a low volume configuration for ease of transport without the likelihood of losing component parts. The stand is not cumbersome, and is lightweight, durable, virtually unbreakable, and relatively easy and inexpensive to construct. While the invention has been herein shown and described in what is presently conceived to be the preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A stand, comprising:

first and second support pieces, each having a leg portion and an upright portion;

first and second readily attachable and detachable connection portions formed in said first and second upright portions, respectively, said connection portions providing ready attachment and detachment of said support pieces, so as to allow said first and second support pieces to be moved from a supporting stand configuration to a low volume easily transportable configuration;

an abutment piece having a peripheral portion and an engagement portion;

said upright portions dimensioned and configured to engage said engagement portion of said abutment piece when said connection portions are attached; and cooperating first and second surface portions formed in said first and second support pieces, respectively, dimensioned and configured to engage said peripheral portion of said abutment piece when said support piece connection portions are detached.

2. A stand as recited in claim 1 wherein said first and second surface portions have a friction fit with said abutment piece peripheral portion so that said abutment piece and support pieces are held together when said connection portions are detached and said abutment piece peripheral portion engages both said first and second surface portions.

3. A stand as recited in claim 2 consisting essentially of said first and second support pieces and said abutment piece.

4. A stand as recited in claim 1 further comprising a latching element cooperable with said abutment piece to define a substantially horizontally closed vertically extending passage.

5. A stand as recited in claim 4 consisting essentially of said first and second support pieces, said abutment piece, and said latching element.

6. A stand as recited in claim 4 wherein said abutment piece peripheral portion comprises first and second legs with a substantially U-shaped recess therebetween; and wherein said latching element comprises an elastic element which has surface manifestations cooperable with said first and second legs.

7. A stand as recited in claim 1 wherein said support pieces and said abutment piece are substantially planar, and of molded polycarbonate.

8. A stand as recited in claim 1 in combination with a string musical instrument having a neck and body with strings extending between said neck and body, said neck supported by said abutment piece, and said body supported by said leg portions, when said connection portions are attached to each other.

9. A stand as recited in claim 1 wherein said first and second support pieces are substantially planar, and said connection portions comprise a slide connection.

10. A stand as recited in claim 3 further comprising hook and loop fasteners for fastening components together.

11. A stand as recited in claim 1 wherein said upright portions define a substantially X-shaped male portion when attached together by said connection portions, and wherein said abutment piece engagement portion comprises a substantially X-shaped female portion which cooperates with said substantially X-shaped male portion so that said abutment piece is securely supported on top of said upright portions; and wherein said X is not completely symmetrical, so as to provide a keying function.

12. A stand as recited in claim 3 in combination with a string musical instrument having a neck and body with strings extending between said neck and body, said neck supported by said abutment piece peripheral portion, and said body supported by said leg portions, when said connection portions are attached to each other, and said latching element substantially prevents detachment of said neck from said abutment piece.

13. A stand as recited in claim 8 further comprising an overcoat of elastomeric material which provides cushioning disposed on parts of said leg portions which support said instrument body.

14. A stand as recited in claim 1 wherein said first and second support piece leg portions each comprise two curved upper surfaces dimensioned and configured to support two devices at the same time, and wherein said abutment piece peripheral portion defines two recesses, each dimensioned and configured to support a device.

15. A stand, comprising:

substantially planar first and second support pieces, each having a leg portion and an upright portion;

first and second readily attachable and detachable connection portions formed in said first and second upright portions, respectively, said connection portions providing ready attachment and detachment of said support pieces;

an abutment piece having a peripheral portion and an engagement portion;

at least one of said upright portions dimensioned and configured to engage said engagement portion of said abutment piece when said connection portions are attached; and a latching element cooperable with said abutment piece to define a substantially horizontally closed vertically extending passage.

16. A stand as recited in claim 15 consisting essentially of said first and second support pieces, said abutment piece, and at least one said latching element.

17. A stand as recited in claim 15 wherein said abutment piece peripheral portion comprises first and second legs with a substantially U-shaped recess therebetween; and wherein said latching element comprises an elastic element which has surface manifestations cooperable with said first and second legs.

18. A stand as recited in claim 17 in combination with at least one string musical instrument having a neck and body with strings extending between said neck and body, said neck supported by said abutment piece peripheral portion substantially U-shaped recess while said elastic element substantially precludes detachment of said neck from said recess, and said body supported by said leg portions, when said connection portions are attached to each other.

19. A stand comprising:

first and second substantially planar support pieces of molded polycarbonate;

a slide connection between said first and second support pieces which allows ready attachment and detachment between said first and second support pieces so as to allow said first and second support pieces to be moved from a supporting stand configuration to a low volume easily transportable configuration;

at least three feet of said first and second support pieces which engage a support surface when said first and second support pieces are attached together by said slide connection;

an abutment piece comprising first and second legs with a substantially U-shaped recess therebetween; and cooperating manifestations on said abutment piece and at least one of said support pieces for mounting said abutment piece above said feet when said support pieces are attached together by said slide connection.

20. A stand as recited in claim 19 in combination with at least one string musical instrument having a neck and body with strings extending between said neck and body, said neck supported by said abutment piece substantially U-shaped recess when said connection portions are attached to each other.

21. A stand as recited in claim 20 further comprising a latching element extendable between said first and second legs to releasably hold said neck of said instrument in said recess.

* * * * *